3,323,412
OPTICAL SYSTEM FOR PROJECTION PRINTERS
Sarkis K. Tchejeyan, Jamestown, N.Y., assignor to
Micro-Line Inc., Jamestown, N.Y.
Filed May 22, 1963, Ser. No. 282,513
7 Claims. (Cl. 88—24)

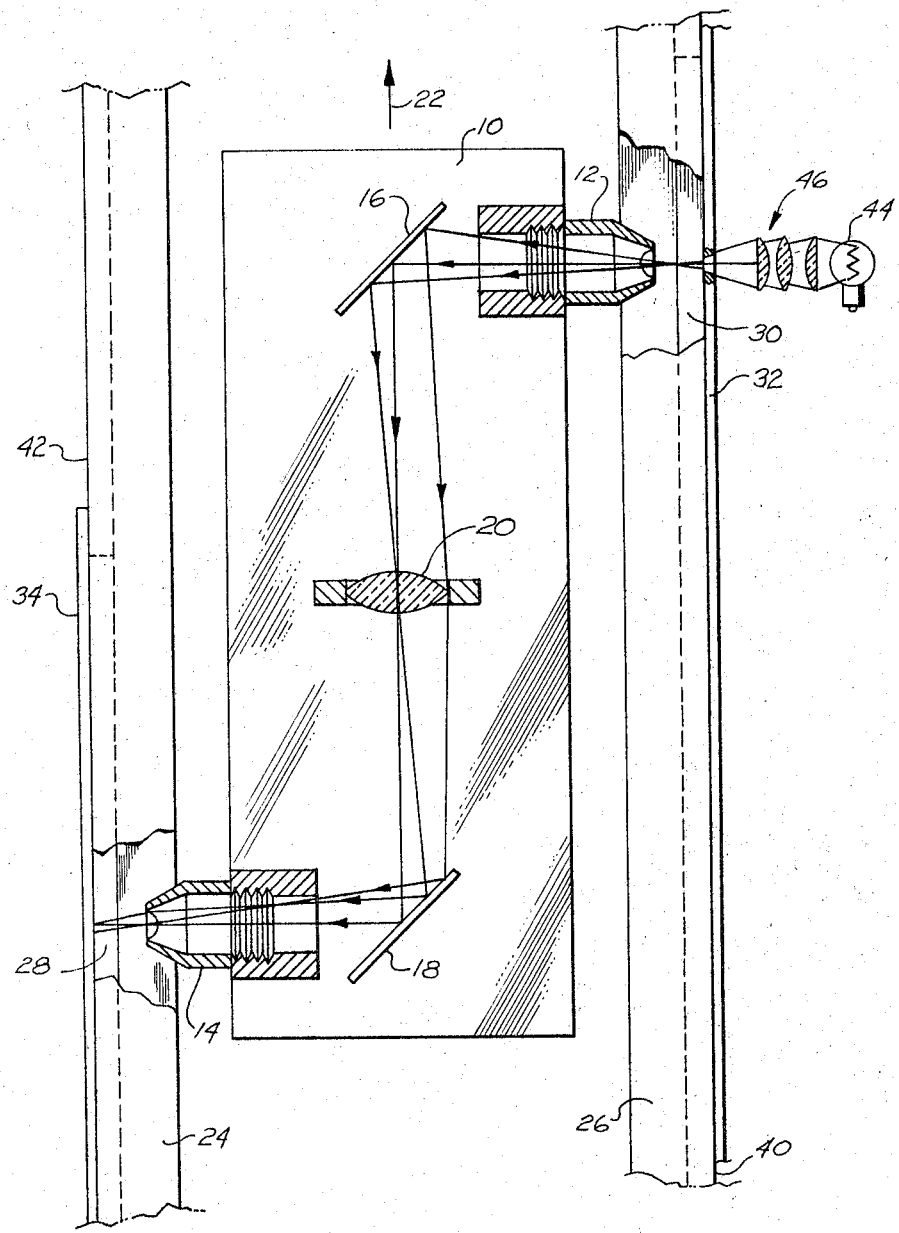

This invention relates to an apparatus for the production of precision photographic copies of master negatives or diapositives, and is particularly directed to the manufacture of precise scale, rulings and the like by projection printing.

For many practical applications, it is desirable to provide a measuring scale having a high degree of accuracy over a relatively great length. For example, it will be highly desirable to provide reproducible measuring scales of 6–24 inch lengths, or longer, in which the scales are capable of being read to $\frac{1}{10,000}$ of an inch and with no more than a few millionths of an inch error in the scales over any given 12 inch span. As a minimum, such a scale would require one thousand lines per inch in which, for reading either directly or in conjunction with a vernier scale, the individual lines would be of a width or thickness in the order of $\frac{1}{10,000}$ of an inch. To render such reproduction economically feasible, while achieving the requisite accuracy, the use of a photographic process is indicated since such a process inherently possesses high integrity, reliability and simplicity.

Photographic printing of scales may be achieved either by contact printing or by projection printing techniques. In the former method the original is held in close contact with the film or plate on which the copy is to be made. A small, distant source of light or a collimated beam of light passing through the original is used to make the exposure on the plate. Although this method permits fairly long scales to be printed, inaccuracies caused by diffraction effects and by shadowing of microscopic inhomogeneities are difficult to overcome. With the projection printing method, on the other hand, it is difficult to produce closely ruled, highly accurate scales of great length. Ordinary optical projection printing in which the full length of scale will be exposed simultaneously is not feasible for the reason that optical systems capable of combining the necessary high resolution with a complete absence of distortion over a field size encompassing the length of the scale (24 inches or greater) are extremely difficult to compute and to construct. To overcome this difficulty, an alternative arrangement for optical projection printing is one in which various portions of the material being reproduced are exposed in sequence, or serially. A variety of such techniques are known and used in document copying and in motion picture film printing, and although these techniques are entirely adequate for their intended purpose, they do not possess the accuracy or stability necessary for the purpose of this invention.

According to the present invention, a scale bearing original and a print-receiving member having a light sensitive surface are engaged with support means which holds the two members in spaced, parallel and fixed relationship to each other. An optical projection system is interposed between such members and substantially uniform relative motion is imparted between the support means and the optical system in a direction along the length of the scale bearing member. In order to control the relative motion between the support means and the optical system, mechanism such as a lathe bed or the like having an associated carriage may be utilized. However, due to the fact that a lathe bed or the like will inevitably produce slight deviations from a true straight line path motion, consequent defocusing of the optical means and deterioration of the effect desired to be produced will result. In order to overcome this effect, the present invention contemplates employing an optical system having two microscope objectives, one of which is focused upon the scale bearing member and the other of which is focused upon the light sensitive member with the optical axes of the two microscope objectives being disposed normal to the members upon which they are focused and wherein the microscope objectives are physically staggered relative to each other in a direction along the path of relative movement between the optical system and the support means. In this fashion, only one of the microscope objectives at a time will be subjected to the effect of lateral irregularities of the lathe bed or the like as compared to such effect being reflected upon both objectives were the same to be disposed in transverse alignment relative to the path of relative movement.

It is therefore of primary concern in connection with this invention to provide an improved photographic projection printer in which a relatively simple arrangement minimizes effects due to irregularities in a lathe bed or like mechanism utilized for effecting relative motion between the optical system and the supporting means for the scale bearing original and the light sensitive member.

Other objects and advantages of the invention will appear from the description hereinbelow and the accompanying drawing wherein:

FIG. 1 is a plan view, partly broken away, showing a system according to the present invention.

With reference to the drawing, a preferred embodiment of the invention employs a base member 10 upon which an optical system is mounted, such optical system including a pair of microscope objectives 12 and 14, light deviating prisms 16 and 18 and an intermediate field lens 20, all arranged substantially as is shown in FIG. 1. Preferably, the base 10 is fixed to a carriage movable along a lathe bed or like mechanism in a path as indicated by the arrow 22. Fixedly mounted relative to the path of movement of the base 10 and the associated optical system thereon, are a pair of platen members 24 and 26, each of which is provided with a longitudinally extending slot 28 or 30 therein and the inner face of each of which is preferably channeled or grooved to receive the corresponding objectives 12 and 14 permitting the same to be optically focused upon the members 32 and 34 carried by these platens 24 and 26. The member 32 may be a photographic negative or original having an elongate scale thereon. The member 34 is provided with a light sensitive surface and each of the members 32 and 34 is held fixedly and immovably against the respective outer faces 40 and 42 of the platen members with which they are associated. A suitable light source 44 and optical condensing system 46 may be employed to provide proper illumination to the member 32.

It will be understood that the objective 12 is adjusted to be focused upon the member 32 whereas the objective 14 is focused upon the surface of the light sensitive member 34 and that during operation of the device, substantially uniform motion is imparted to the base 10 so that the same causes the objective 12 to traverse the length of the scale on the original member 32.

The optical system on the base 10 is of such character that the scale on the member 32 will be produced as a real, erect image on the light sensitive surface of the member 34 serially and progressively as the base 10 is moved as aforesaid. The objectives 12 and 14 are identical so that a one-to-one system is provided and the optical system is characterized by having three conjugate planes, one at the scale on the member 32, another at the light sensitive surface of the member 34, and the third midway between the first two, it being at this last conjugate plane that the field lens 20 is placed. Preferably, the focal lengths of the objectives 12 and 14 are identical, as aforesaid, and it is also preferred that the focal length of the field lens 20 is equal to ¼ the back focal lengths of the microscope objectives 12 and 14.

Whereas it is appreciated that relative motion between the support means for the members 32 and 34 and the optical system may be achieved by holding either one of them stationary while the other one is movable, it is preferred that the optical system be transported and that the platens 24 and 26 be held in fixed, parallel and spaced relationship to each other so as to correspondingly dispose the members 32 and 34. The direction of movement of the base 10 is parallel to the two parallel members 32 and 34 and for this purpose, not shown in the drawing since it is of conventional nature, machine tool mechanisms may be employed. For example, the base 10 may be fixed to the carriage of a lathe, the carriage of which operates on a conventional way rigid with the bed of the mechanism. Such an arrangement will give as nearly a true straight line motion to the base 10 as is possible, although it is to be understood that even with the best prior art techniques of machining, such an arrangement will inevitably produce slight local deviations or lateral shifting of the carriage, and consequently of the base 10, as the carriage is moved along the lathe bed. With the particular arrangement as is shown in FIG. 1, the effect of any such lateral deviation caused by inaccuracies in the lathe bed or the like will be minimized in their effect upon the photographic system. The reason for this is that the objectives 12 and 14 are longitudinally staggered rather than being disposed directly opposite each other in a direction transverse to the path of movement as indicated by the arrow 22. If the latter condition were to prevail, that is if the objectives 12 and 14 were disposed in lateral or transverse alignment, opposite each other, any local lateral shifting of the base 10 would cause defocusing of both objectives. With the arrangement as is shown in FIG. 1, on the other hand, it will be appreciated that local lateral shifting will be effected upon only one of the objectives at any given instant. That is to say, the local inaccuracies of the lathe bed will not cause a uniform lateral shifting of the base 10 since the lathe carriage will be supported along a substantial extent of the lathe bed. Thus, the carriage and consequently the base 10 will tend to cock or tilt relative to the path of movement 22 and the total lateral shifting will be of greatest magnitude at that region corresponding to the lathe bed inaccuracy which produces such shifting. Consequently, as the base 10 is moved along, and a local lathe bed inaccuracy is encountered, the objective 12 will first be subjected to this lateral shifting and the objective 14 will be substantially free of any such shifting whereas, as the base 10 continues to move, the effect produced on the objective 12 will subside and at some later time, the objective 14 will pass by the local inaccuracy in the lathe bed and will be shifted the maximum amount while the objective 12 is substantially undeviated. Thus, rather than have both objectives defocused at the same time, they will be individually defocused by lateral shifting caused by local inaccuracies in the lathe bed or other mechanism used to support and move the base 10.

It is to be understood that certain changes and modifications as illustrated and described may be without departing from the spirit of the invention or the scope of the following claims.

I claim:

1. A photographic projection printer comprising,
    a negative holder and a print holder,
    said holders being spaced apart and mutually parallel,
    an optical system between said holders for imaging an area of the negative holder onto an area of the print holder,
    and means for moving said optical system in a direction parallel to said holders,
    said optical system including a pair of objectives, one adjacent said negative holder and the other adjacent said print holder, said objectives having their optical axes aligned normal to the direction of travel of said optical system and being staggered with respect to each other in the direction of such movement.

2. In a photographic projection printer including means for holding a photographic original immovably in a given plane and means for holding a print receiving surface immovably in a second plane parallel to and spaced from said first plane,
    an optical projection system for imaging a portion of said photographic original on a corresponding portion of the surface of said print receiving surface,
    and means for transporting said optical system parallel to said first and second planes,
    said optical system including a pair of objectives, one focused on said photographic original and the other focused on said print receiving surface, said objectives having their optical axes disposed normal to the surfaces upon which they are focused and being staggered with respect to each other in the direction of movement of the optical system.

3. In the printer according to claim 2 wherein said optical system also includes bight deviating means for aligning said objectives along a common optical axis, and a field lens disposed optically midway between said objectives.

4. In the printer according to claim 3 wherein the focal lengths of said objectives are identical and the focal length of said field lens is ¼ the back focal length of said objectives.

5. A photographic projection printer comprising, in combination,
    an original having an elongate scale thereon,
    an elongate print-receiving member having a sensitive surface,
    support means for holding said original and said print receiving member in spaced, parallel fixed relation to each other,
    an optical projection system having three conjugate planes, one at said scale, one at said sensitive surface, and one midway between the first two,
    and means for imparting substantially uniform relative motion between said support means and said optical system in a direction along the length of said scale,
    said optical system including a pair of objectives, one focused upon said scale and the other focused upon said sensitive surface,
    said objectives having their optical axes disposed normal to the surfaces upon which they are focused, and said objectives being staggered with respect to each other in a direction along the path of relative movement between said optical means and said support means.

6. A projection printer according to claim 5 wherein said optical system also includes light deviating means for aligning said objectives along a common optical axis, and a field lens disposed at the last mentioned of said conjugate planes.

7. The projection printer according to claim 6 wherein the focal lengths of said objectives are identical and the focal length of said field lens is ¼ the back focal length of said objectives.

References Cited

UNITED STATES PATENTS 2,464,793  3/1949  Cooke.

NORTON ANSHER, *Primary Examiner.*

EVON C. BLUNK, *Examiner.*

R. A. WINTERCORN, *Assistant Examiner.*